United States Patent
Hotra (10) Patent No.: US 10,705,933 B2
(45) Date of Patent: Jul. 7, 2020

(54) SYSTEM INTEGRATION USING VIRTUALIZATION

(71) Applicant: The Boeing Company, Chicago, IL (US)

(72) Inventor: Jonathan N. Hotra, Maryland Heights, MO (US)

(73) Assignee: THE BOEING COMPANY, Chicago, IL (US)

( * ) Notice: Subject to any disclaimer, the term of this patent is extended or adjusted under 35 U.S.C. 154(b) by 108 days.

(21) Appl. No.: 15/652,763

(22) Filed: Jul. 18, 2017

(65) Prior Publication Data

US 2019/0026204 A1 Jan. 24, 2019

(51) Int. Cl.
| | |
|---|---|
| *G06F 11/00* | (2006.01) |
| *G06F 11/26* | (2006.01) |
| *G06F 9/455* | (2018.01) |
| *G06F 11/36* | (2006.01) |

(52) U.S. Cl.
CPC .......... *G06F 11/261* (2013.01); *G06F 9/455* (2013.01); *G06F 11/3664* (2013.01); *G06F 11/3668* (2013.01); *G06F 11/3684* (2013.01); *G06F 11/36* (2013.01)

(58) Field of Classification Search
CPC ............... G06F 11/261; G06F 11/3664; G06F 11/3668; G06F 11/3684
See application file for complete search history.

(56) References Cited

U.S. PATENT DOCUMENTS

| | | | |
|---|---|---|---|
| 7,597,951 B2 | 10/2009 | Bjormander et al. | |
| 2005/0216920 A1 | 9/2005 | Tewari et al. | |
| 2006/0004554 A1 | 1/2006 | Vega et al. | |
| 2007/0198240 A1 | 8/2007 | Moriat | |
| 2008/0155347 A1* | 6/2008 | Terrell | G06F 11/3644 714/45 |
| 2008/0229150 A1 | 9/2008 | Foster et al. | |
| 2009/0198988 A1* | 8/2009 | Bai | G06F 9/455 713/2 |
| 2011/0307739 A1* | 12/2011 | El Mahdy | G06F 11/261 714/28 |
| 2012/0124166 A1* | 5/2012 | Yanagisawa | G06F 11/2097 709/217 |
| 2013/0155083 A1 | 6/2013 | McKenzie et al. | |

(Continued)

OTHER PUBLICATIONS

Unknown, "Virtual Validation with dSPACE: Benefits the whole ECU development process", dSPACE, Sep. 2015, 28 pages.
(Continued)

*Primary Examiner* — Charles Ehne
(74) *Attorney, Agent, or Firm* — MH2 Technology Law Group LLP (57) ABSTRACT

Methods and systems are provided for testing a physical hardware device by a virtual hardware device using a virtualization system. The methods and systems perform operations including determining a memory location of a variable through which the virtual hardware device exchanges information with an external hardware resource. The operations also include exchanging the information with the external hardware resource via the memory location of the variable. The memory location of the variable used by the virtual hardware device is the same as a memory location of the variable used by the physical hardware device.

20 Claims, 5 Drawing Sheets

(56) References Cited

U.S. PATENT DOCUMENTS

| | | | |
|---|---|---|---|
| 2013/0166271 A1 | 6/2013 | Danielsson et al. | |
| 2014/0157050 A1* | 6/2014 | Zhao ..................... | G06F 11/263 |
| | | | 714/28 |
| 2015/0234731 A1* | 8/2015 | Williams ............ | G06F 11/3684 |
| | | | 717/126 |
| 2015/0339216 A1* | 11/2015 | Wade .................. | G06F 11/3688 |
| | | | 714/38.1 |
| 2016/0188451 A1* | 6/2016 | Xia ....................... | G06F 11/261 |
| | | | 717/135 |

OTHER PUBLICATIONS

Unknown, "Virtual Validation in Practice: Functional SIL stations at BMW", dSPACE Magazine, Jan. 2016, 6 pages.

Extended European Search Report dated Jan. 7, 2019 in corresponding European Application No. 18174150.5.

* cited by examiner

SYSTEM INTEGRATION USING VIRTUALIZATION

CROSS-REFERENCE TO RELATED APPLICATION

This application is related to U.S. patent application Ser. No. 15/476,025, titled "Emulation of Hardware Components," filed Mar. 31, 2017, the content of which is incorporated by reference herein in its entirety.

FIELD

This disclosure relates to modeling and virtualization. In particular, the present disclosure provides for high fidelity model-based design.

BACKGROUND

During the development of computerized systems (e.g. aircraft avionics), software development, integration, and test activities often do not occur until physical hardware is available. Various approaches have been attempted to perform these activities earlier in the timeline of product development from requirement definition to production. A first approach is to develop and test the software on a proxy system (e.g., a personal computer) and then port the software to the actual physical hardware when the hardware is eventually available. For example, in earliest stage of software development, Computer Software Units (CSU) can be developed and tested at the unit test level. CSUs can then be combined to build Computer Software Components (CSC). CSCs can be subsequently combined to create Computer Software Configuration Items (CSCI). At the CSCI level, there is enough software may be present to start integration level testing.

Integration testing with the first approach may provide an application program interface (API) that enables the software to execute on the proxy system. This API provides an abstraction layer allowing hardware of the proxy system to be used by the application program. In this approach, the virtual system is self-contained on the personal computer. Input/output calls by an API call to access a communications channel (e.g., a MIL-STD-1553 bus) would, for example, be routed to a simulated bus that connects the application software under development to other subsystem models on the bus for integration testing. However, to allow development of the application program on different types of proxy systems, the details of the actual hardware are abstracted differently. As a result, at least two different APIs are implemented for the application program—one for the proxy system, and one for the physical hardware. Accordingly, the application program is compiled for two different environments during development.

In a second approach, integration testing can be started before defining an API. This approach may be used with pure simulation techniques, such as Model Based Design (MBD) and Model Based System Engineering (MBSE). MBD provides early integration of core functionality of the application program. However, MBD and MBSE typically integrate only the core functionality of an application for a physical hardware device, while excluding large sections of application supporting software that exist in physical hardware, such as APIs, hand code, interrupt service routine's (ISRs), board support packages (BSPs), operating systems (OSs), and input output (I/O) protocols. MBD/MBSE can integrate with other simulations and this is sometimes called co-simulation, but MBD/MBSE is rarely concerned with how the actual transmission of data occurs between systems comprising an overall system.

A third approach to integration testing combines the application program with other systems without defining an API and without being concerned with how information is actually transferred in the system. This third approach modifies or patches application program to tie engineering units (e.g., variables having a value and a unit of measurement) directly with other simulated systems to integrate the overall system. Doing so is similar to the MBD/MBSE approach. However, this third approach works at the actual software level and not at the model level. However, it is difficult to script the connectivity modifications to the application program and the modifications/patches are often a time consuming manual process. Thus, the third approach is not well suited for early system design during which the application software frequently changes. The present disclosure is provided to address these and other problems.

SUMMARY

The present disclosure provides methods and systems for testing a physical hardware device by a virtual hardware device using a virtualization system. The methods and systems perform operations that include determining a memory location of a variable through which the virtual hardware device exchanges information with an external hardware resource. The operations also include exchanging the information with the external hardware resource via the memory location of the variable. The memory location of the variable used by the virtual hardware device is the same as a memory location of the variable used by the physical hardware device.

The present disclosure also provides a virtualization system for emulating a physical hardware device. The virtualization system can include a processor, a data storage device, and program instructions stored on the data storage device. The program instructions, when executed by the processor, control the virtualization system to perform operations including emulating operation of the physical hardware device using a virtual hardware device based on a variable location information associating a memory location of the virtualization system with a memory location of a variable via which a virtual hardware device and the physical hardware device are configured to exchange information with an external hardware resource.

The present disclosure further provides a virtualization system that performs operations including providing a virtual hardware device including a virtual processor and virtual memory device that emulate a physical processor and a physical memory device of a physical hardware device. The operations also include determining a variable in the virtual memory device via which application software of a physical hardware device is configured to exchange information with an external hardware resource. Additionally, the operations include determining a location of the variable within the memory device of the virtualization system. Moreover, the operations include exchanging information among the virtual hardware device and an external hardware resource via the location of the variable within the memory device of the virtualization system.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

The present disclosure provides systems and methods for high fidelity integrated system using virtualization. In accordance with aspects of the present disclosure, virtualization permits integrated testing of a device in a system early in the development timeline, before any APIs, device drivers, and board support packages exist for the device. Implementations of a virtualization system consistent with the present disclosure can identify variables used by application software for a physical hardware device and memory locations where the variables are read/written by the physical hardware device. The variables can be, for example, engineering unit variables provided from another device (e.g., a sensor) of the system (e.g., an avionics suite).

Rather than attempt to transmit the variables to the application software by way of an API, which is not available at early stages of the development timeline, a virtual hardware device can exchange the variables with other devices (e.g., actual, modeled, or virtualized devices) by intercepting them at the identified memory locations (e.g., memory addresses). Thus, implementations consistent with the present disclosure enable emulation of the physical hardware device using a virtual hardware device without the need to develop or modify any API. Additionally, modification of the application software when hosting it on the physical hardware is avoided because the memory locations are exactly the same or substantially equivalent to the memory locations used by the application software in the virtual hardware device. Also, there is no need to rehost and/or recompile application software for the physical hardware because emulated processors can be created to match the physical hardware. For example, the use of exact memory locations to connect variables in a virtualization layer and emulation of processor in virtualization hardware allow application software for a physical hardware to be run unmodified on personal computer-based development platform or the like.

Because the virtual hardware in accordance with aspects of the present disclosure substantially matches the physical hardware as a design of the device matures, developers can work in parallel. For example, initially and in early stages the development timeline, before any APIs, device drivers, and/or board support packages exist for the components of the system, implementations consistent with the present disclosure can represent the physical system and their communications with other external resources using only memory intercepting in the virtualization system, as described herein. As the design and development of the physical system matures, such that some APIs, device drivers, and/or board support packages may exist, implementations of the present disclosure can provide a hybrid virtualization in which some components are virtualized and communicate using such memory intercepting, as described herein, and other components are virtualized an communicate via APIs using memory mapping, as described in related U.S. patent application Ser. No. 15/476,025.

Additionally, the virtual hardware in accordance with aspects of the present disclosure can provide test points for test and analysis (e.g., cybersecurity analysis) of a design that would be inaccessible in the physical hardware device. For example, the virtual hardware may allow developers to access and monitor substantially all memory accesses, instructions executed, and register states of the virtual hardware device. As a result, implementations of the systems and methods disclosed herein can substantially reduce the time and cost involved in developing and testing computer-implemented systems. Additionally, by enabling high fidelity integration testing of a new hardware device before its hardware components (e.g., interrupt controllers, I/O devices, and network interfaces) and software components (APIs, BSP, drivers, operating systems, etc.) are fully designed and/or implemented, implementations consistent with the present disclosure enable developers to identify errors and potential problems early in the development timeline of the hardware device. Accordingly, the developers can identify and repair errors that would be exponentially more expensive to repair if found after the application software is executed on the physical hardware device.

Figure 1:
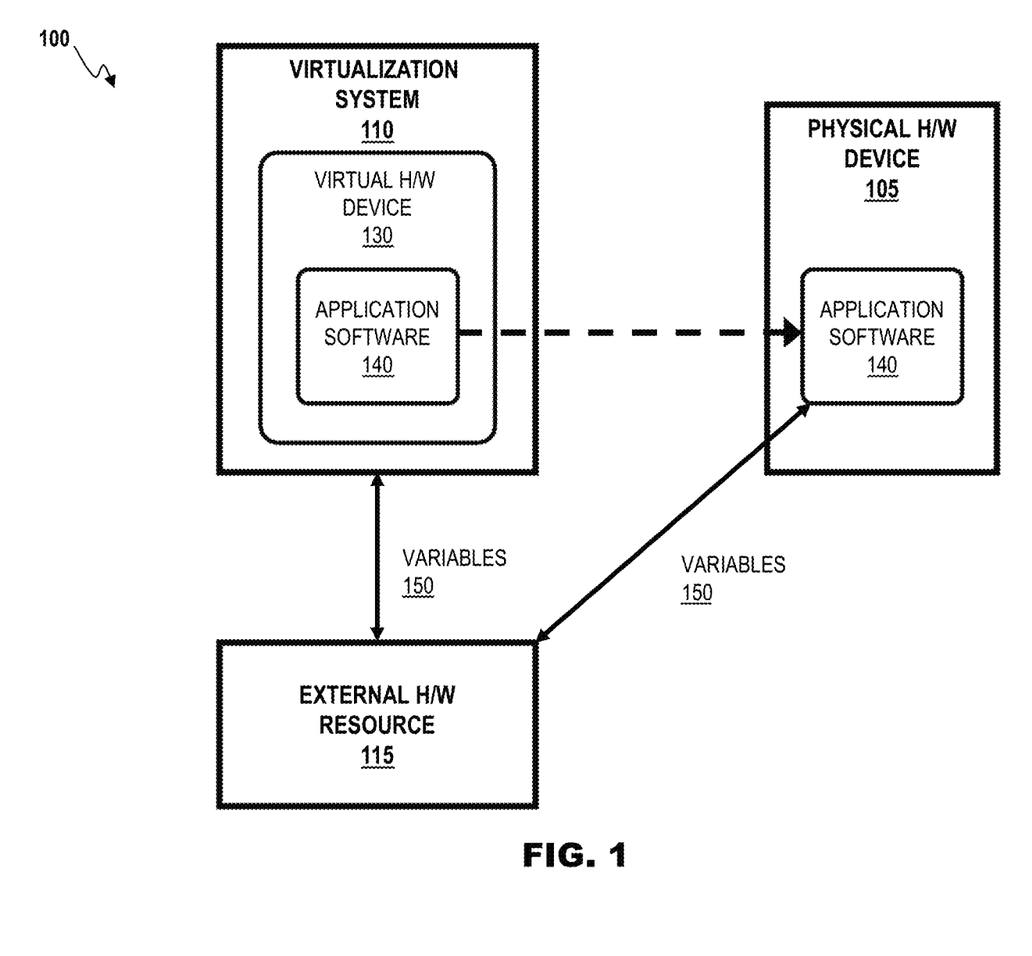
FIG. 1 shows a system block diagram illustrating an example of an environment for implementing systems and processes in accordance with aspects of the present disclosure.

FIG. 1 shows a block diagram illustrating an example of an environment 100 for implementing systems and processes in accordance with aspects of the present disclosure. The environment 100 can include a physical hardware device (PHD) 105, a virtualization system 110, and an external hardware resource 115. The physical hardware device 105 can be a computer-implemented subsystem of an integrated system. For example, the physical hardware device 105 can be a component (e.g., a line-replaceable unit (LRU)) of an avionics system, such as a mission computer, a navigation unit, a communication unit, an engine management unit, a crew interface unit, a threat detection unit, an electronic countermeasures unit, a stores management unit, or an integrated avionics unit. The physical hardware device 105 could utilize an integrated modular avionics architecture or any technique that reduces federation a federation of hardware devices into a partitioned centralized computing architecture. In accordance with aspects of the present disclosure, the physical hardware device 105 can be part of a system that is under development. In implementations, the physical hardware device 105 can be an entirely unimplemented device or a partially implemented device (e.g., a prototype unit) for which only requirements and some components have been identified, and for which no API and other low level software has been developed.

The virtualization system 110 can be a computing system comprised of hardware and software that emulates other devices. In implementations, the virtualization system 110 can be one or more general purpose computers, such as a server or a desktop computer that hosts one or more virtual hardware systems (e.g., virtual hardware device 130) that emulate all or part of physical hardware devices, such as the physical hardware device 105. For example, the virtualization system 110 can use QUICK EMULATOR ("QEMU"), which is an open source software application that performs hardware virtualization.

The virtual hardware device (VHD) 130 can be a partial or full emulation of the physical hardware device 105 within the virtualization system 110. The virtual hardware device 130 can execute an exact copy or a substantially exact copy of application software 140 that will be executed by the physical hardware device 105. A developer can obtain information for creating the virtual hardware device 130 from hardware components of the physical hardware device 105 (e.g., a processor and a memory) and documentation describing the physical hardware device 105. The documentation can be information defining operational requirements and operating details of the hardware components. For example, the documentation can be technical specifications of the hardware components and requirements of the physical hardware device. Thus, prior to acquisition and/or assembly of any hardware components into the physical hardware device 105, the virtual hardware device 130 can be used to develop, test, and debug the application software 140 by emulating the components of the physical hardware device. As such, development and testing of the physical hardware device 105 and application software 140 can occur in parallel.

The external hardware resource 115 is one or more hardware device external to the physical hardware device 105 and the virtualization system 110 that can exchange information with the application software 140. In some cases, the external hardware resource 115 can be a physical hardware device. For example, the external hardware resource 115 can be a LRU or a sensor. In other cases, the external hardware resource 115 can be a computing system that emulates a hardware device in the integrated system (e.g., a MBD system or virtualization system). For example, the external hardware resource 115 can be a model, emulation, or a virtualization of a hardware device. In early stages the development timeline, before APIs, device drivers, and/or board support packages exist for all the components of the physical system, virtualized components of the virtual hardware device 130, the virtualization system 110 can exchange information with the external hardware resource 115 by storing variables (e.g., engineering units) in particular memory locations of memory that correspond to the memory locations used for such variables by the application software when executed by either the physical hardware device 105 or the virtual hardware device 130. As the design and development of the physical system matures and APIs and/or device drivers are available, some of the virtualized components can be enhanced to communicate with external hardware resource 115 via such APIs and device drivers.

Because the virtual hardware device 130 matches the physical hardware device 105, each developer involved in the development and production of the physical hardware device 105 can implement a copy of the virtual hardware device 130 at their respective workstations (e.g., a respective virtualization system 110). High-fidelity emulation provided by the virtual hardware device 130 allows for problems with the application software 140 to be caught early in the development timeline and, therefore, provide considerable cost savings. Additionally, as the development timeline progresses and the physical hardware device 105 matures, the virtual hardware device 130 and the application software 140 can be updated and tested in parallel.

Figure 2:
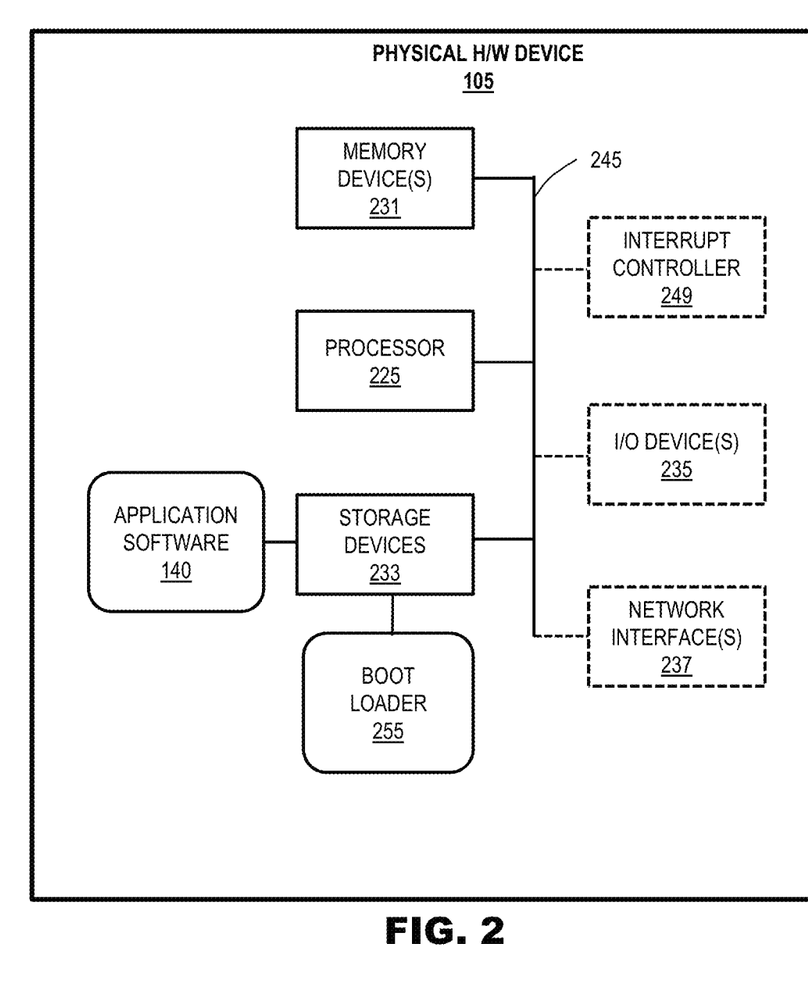
FIG. 2 shows a system block diagram illustrating an example of a physical hardware device in accordance with aspects of the present disclosure.

FIG. 2 shows a system block diagram illustrating an example of a physical hardware device 105 in accordance with aspects of the present disclosure. The physical hardware device 105 can be the same or similar to that previously described. The physical hardware device 105 includes hardware and software that may be emulated by a virtual machine (e.g., virtual hardware device 130) using a virtualization system (e.g., virtualization system 110) in accordance with aspects of the present disclosure.

The physical hardware device 105 can be any type of computing system including a general and/or specific purpose hardware capable of executing computer program instructions installed thereon (e.g., a personal computer, server, application-specific computing device, etc.). It is understood that the physical hardware device 105 is only representative of various possible equivalent-computing devices. To this extent, in embodiments, the functionality provided by the physical hardware device 105 can be any combination of general and/or specific purpose hardware and/or computer program instructions used for a variety of applications (e.g., industrial control and/or automation). In implementations, the physical hardware device 105 can be special-purpose device, such as an avionics LRU.

The physical hardware device 105 can be comprised of various components, including one or more processors 225, one or more memory devices 231, one or more storage devices 233, one or more input/output (I/O) devices 235, and one or more network interface devices 237. The processors 225 can include a microprocessor, a microchip, and/or an application-specific integrated circuit. The memory devices 231 can include one or more of a local storage, such as random access memory (RAM) and a cache memory, employed during execution of program instructions. The storage devices 233 can comprise computer-readable, non-volatile hardware devices that store information and program instructions, such as application software 140 and bootloader 255. For example, the storage system 233 can be one or more flash drives, non-volatile memory, and/or hard disk drives. The I/O devices 235 can include any device that enables an individual to interact with the physical hardware device 105 (e.g., a user interface) and/or any device that enables the physical hardware device 105 to communicate with one or more other computing devices using any type of communications link. The I/O device 235 can be, for example, a touchscreen display, pointer device, keyboard, etc. The network interface devices 237 can include any transceiver device configured to send and receive data via a network communication link.

Additionally, the physical hardware device 105 can include one or more communication channels 245 (e.g., a data bus) through which the processors 225, memory devices 231, storage devices 233, input/output (I/O) devices 235, and network interface devices 237 can communicate. Further, the physical hardware device 105 can include an interrupt controller 249 which can be a programmable device used to manage communications of the processors 225, the memory devices 231, the storage devices 233, the input/output (I/O) devices 235, and/or the network interface devices 237 on to the communication channel 245, including allowing priority levels to be assigned to its interrupts.

The processor 225 executes computer program instructions (e.g., an operating system and/or application programs), which can be stored in the memory device 231 and/or storage devices 233. For example, the processor 225 can execute program instructions of the boot loader 255 and the application software 140. The boot loader 255 can comprise program instructions that initiate operation of the physical hardware device 105 by loading its operating system. The application software 140 can be, for example, application-specific program instructions (e.g., avionics software).

As described previously herein, the physical hardware device 105 may initially be partially designed and/or implemented. In an early stage of the development timeline, a design of the physical hardware device 105 my only include a subset of the components that will be included in the later stages. For example, early design specifications for the hardware device 105 may initially define only the processor 225, the memory device 231, the storage device 233, and the bootloader 255, upon which an early version of the application software 140 (indicated by the solid lines and boxes) will execute. As hardware information (e.g., firmware and schematics), software (e.g., APIs, BSPs, operating system, drivers), communication protocols, and virtual hardware, such as interrupt controller 249, I/O devices 235, and network interfaces 237) are subsequently defined, developed, and/or integrated during the development timeline for the physical hardware device 105 (indicated by the dashed lines), virtual components for such hardware components can be incorporated into the respective virtual hardware device (e.g., virtual hardware device 130). In some implementations, doing so may result in the virtual hardware device being a hybrid system in which some communications of some components are emulated using memory intercepting, as described above, and better defined and/or developed components are emulated using memory mapping, as described, e.g., in U.S. patent application Ser. No. 15/476,025. Ultimately, the system could transition to the full virtual machine desktop test environment approach.

Figure 3:
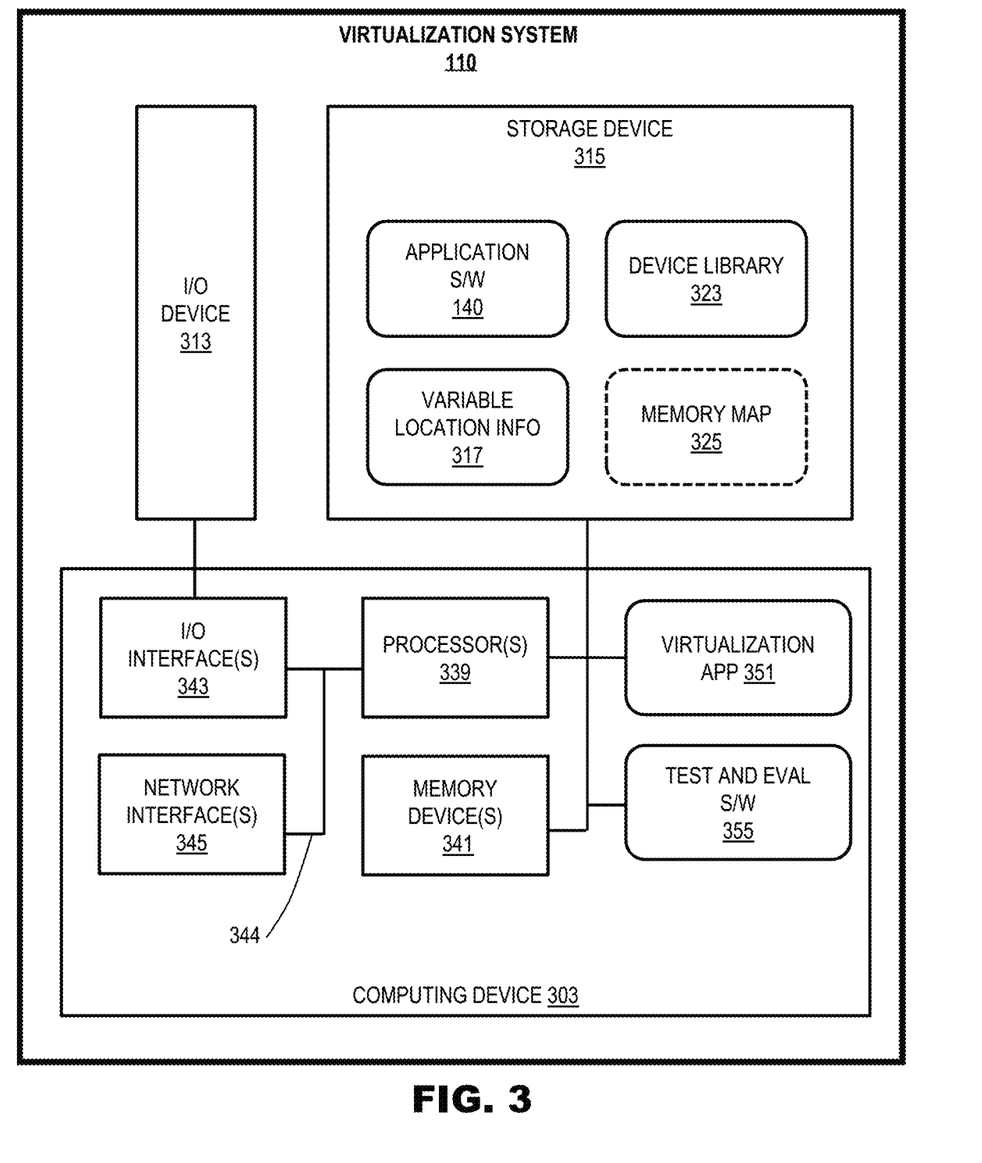
FIG. 3 shows a system block diagram illustrating an example of a virtualization system in accordance with aspects of the present disclosure.

FIG. 3 shows a system block diagram illustrating an example of a virtualization system 110, which can be the same or similar to that described above. The virtualization system 110 includes hardware and software that perform the processes and functions disclosed herein. The virtualization system 110 can comprise any type of computing system including a combination of general and/or specific purpose hardware capable of executing computer program instructions installed thereon.

The virtualization system 110 includes a computing device 303, an input/output (I/O) device 313, and a storage device 315. The I/O device 313 can include any device that enables an individual to interact with the computing device 303 (e.g., a user interface) and/or any device that enables the computing device 303 to communicate with one or more other computing devices using any type of communications link. The I/O device 313 can be, for example, a touchscreen display, pointer device, keyboard, etc.

The storage device 315 can comprise a computer-readable, non-volatile hardware storage device that stores information and program instructions. For example, the storage device 315 can be one or more flash drives and/or hard disk drives. In accordance with aspects of the present disclosure, the storage device 315 can store application software 140, a variable location information 317, and a device library 323. Additionally, in some implementations, the storage devices 315 can store a memory map 325. The application software 140 can be a program that will eventually execute on a physical hardware device (e.g., physical hardware device 105). In implementations, the application software 140 substantially mirrors the application software of the physical hardware device.

The variable location information 317 describes memory locations used by the application software 140 to exchange (e.g., send and/or receive) variables (e.g., variables 150) with an external hardware resource (e.g., external hardware resource 115). In implementations, the variable location information 317 comprises information defining locations of variables in the memory 231 of the hardware device 105 (e.g., addresses or offsets from addresses where information is held in stack memory, heap memory, or static memory). For example, the variable location information 317 can represent addresses in memory determined by a compiler after the compiler compiles the application software 140. The compiler can also generate a map of files that associates software names to the memory locations.

The device library 323 can be a repository of computer-readable information and instructions describing emulations of one or more components of the physical hardware device (e.g., physical hardware device 105), which may have been previously been created and stored for future use. For example, the device library 323 can store predetermined virtualizations of a processor (e.g. processor 225), memory device (e.g., memory device 231), and storage device (e.g., storage device 233).

In some implementations, the memory map 325 describes connections between components of the physical hardware systems from a memory interface perspective, as detailed in U.S. patent application Ser. No. 15/476,025. In implementations, the memory map 325 comprises information defining locations of memory blocks of the hardware components in the memory 231 or in the input/output device 235 of the hardware system 105. For example, the memory map 325 can represent locations of information for memory registers of hardware components of the physical hardware system as an offset from a starting memory address.

In embodiments, the computing device 303 includes one or more processors 339 (e.g., microprocessor, microchip, or application-specific integrated circuit), one or more memory devices 341 (e.g., RAM, read-only memory (ROM)), one or more I/O interfaces 343, and one or more network interface interfaces 345. The memory devices 341 can include a local memory (e.g., a random access memory and a cache memory) employed during execution of program instructions. Additionally, the computing device 303 includes at least one communication channel 344 (e.g., a data bus) by which it communicates with the I/O device 313 and the storage device 315. The processor 339 executes computer program instructions (e.g., an operating system and/or application programs), which can be stored in the memory device 341 and/or storage device 315.

The processor 339 can also execute computer program instructions of a virtualization application 351 (e.g., QEMU) and test and/or evaluation software 355. The virtualization application 351 can be the same or similar to that previously described. For example, the virtualization application 351 can include a hypervisor or virtual machine monitor software. In accordance with aspects of the present disclosure, the virtualization application 351 can provide a virtual machine (e.g., virtual hardware device 130) using the application software 140 that can virtualize some or all of the components of a physical system and their communications with external resources (e.g., external hardware resource 115) using memory intercepting.

The test and evaluation software 355 can be an application or program including computer-readable instructions and information configured to test, evaluate, and/or validate software. For example, test and evaluation software 355 can execute test routines that verify whether application software 140 behaves as expected in response to a predetermined scenario. Additionally, the test and evaluation software 355 can execute cybersecurity routines that test attack vectors of malicious software. For example, the test and evaluation software 355 can record complete state (registers, memory, hardware states, etc.) of a virtual machine as instructions execute to allow observation and analysis of a compromised system.

It is noted that the computing device 303 is representative of various possible equivalent-computing devices that can perform the processes described herein. To this extent, in embodiments, the functionality provided by the computing device 303 can be any combination of general and/or specific purpose hardware and/or computer program instructions. In the disclosed embodiments, the program instructions and hardware can be created using standard programming and engineering techniques, respectively.

Figure 4:
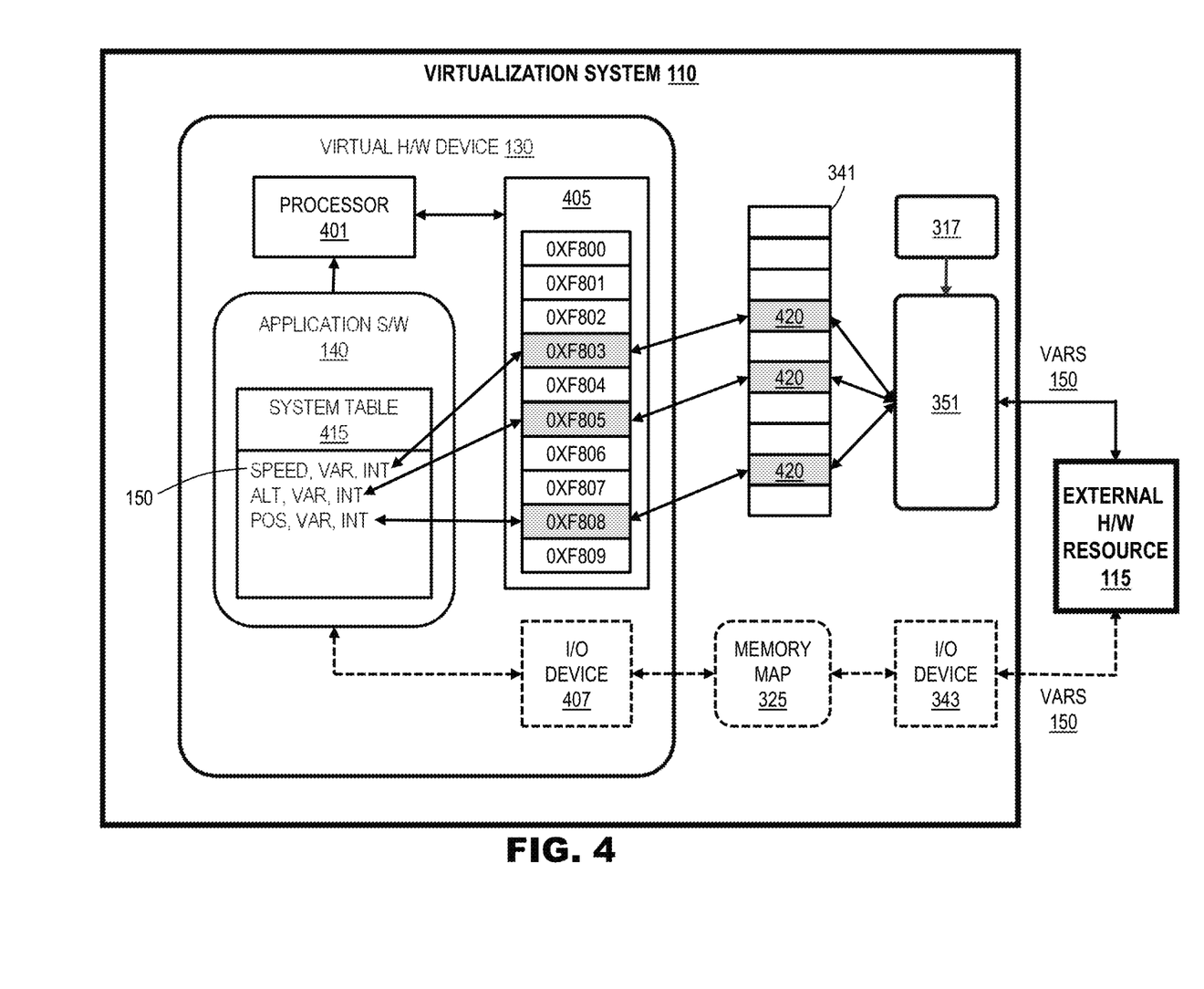
FIG. 4 shows functional block diagram illustrating an example of memory intercepting in accordance an embodiment of the present disclosure.

FIG. 4 illustrates a functional block diagram of an example of a virtualization system 110 communicating with an external hardware device 115, in accordance with implementations of the present disclosure. The virtualization system 110 can include a virtual hardware device 130, variable location information 317, a memory device 341, and a virtualization application 351, which can be the same or similar to those previously described herein. Additionally, the virtual hardware device 130 can include application software 140 for a physical hardware device (e.g., physical hardware device 105), as previously described herein. In accordance with aspects of the present disclosure, the virtual hardware device 130 can include a virtual processor 401, a virtual memory device 405, and a virtual I/O device 407 that emulate a physical processor (e.g., processor 225), a physical memory device (e.g., memory device 231), and a physical I/O device (e.g., I/O device 235).

The memory device 341 of the virtualization system 110 can include memory locations 420 at which variables 150 communicated to/from the virtual hardware device 130 are stored by the virtualization application 351. The virtualization application 351 transparently handles reads/writes by the application software 140 to the virtual memory device 405 to store one or more variables 150 in the corresponding memory locations 420 in the memory device 341. As such, the application software 140 can exchange a particular variable 150 (e.g., speed) with the external hardware resource 115 by performing read and/or write operations in exactly the same or substantially the same memory address (e.g. 0XF803) of the virtual memory device 405 as is/will be used in the physical memory device (e.g., memory device 231) of a physical hardware device (e.g., physical hardware device 105). In implementations, the memory device 341 can be a shared memory (e.g., a dual-port memory, a socket, or a pipe) that exchanges the variables 150 between the virtual memory devices 405 and external hardware resources (external hardware resource 115). The use of such shared memory allows seamless read/writes of the variables 150 to occur between virtual memory device 405 and external hardware resource 115. Since the shared memory is implemented in the virtualization system 110 (e.g., by a virtualization layer), the application software 140 does not need to be modified to accommodate this connectivity.

The variable location information 317 associates addresses of the variables 150 (e.g., engineering unit variables) in the virtual memory device 405 with their memory locations 420 in the physical memory device 341 of the virtualization system 110. Based on the variable location information 317, the virtualization application 351 can intercept variables 150 received from the external hardware resource and store the variables 150 to memory locations 420 of the memory device 341 corresponding to particular addresses of the variables 150 used by the virtual memory device 405 and by the corresponding physical memory device (e.g., memory device 231). For example, as the application software 140 is executing within the virtual hardware device 130, when the application software 140 writes a variable 150 an address of the virtual memory device 405, the virtualization application 351 intercepts the variable 150 corresponding memory address of the physical memory device 341 and communicates the variable to the external hardware resource 115. When the external hardware resource 115 transmits the variable 150 to the virtual hardware device, virtualization application intercepts the variable 150 and routes it to the corresponding location in memory device 341, which makes it available to the application software 140 executed by the virtual hardware device 130. Connections for integration testing of the virtual hardware device 130 with the external hardware resource are, therefore, provided without modifications to the application software 140 and without any API.

In some implementations, after the physical hardware device matures to include APIs, device drivers, and/or board support packages for some components (e.g., I/O device 235, network interface 237, and/or interrupt controller 249), implementations consistent with the present disclosure can provide hybrid virtualization in which some components communicate by memory intercepting using the variable location information 317, as described above, and other components, such is I/O device 407 communicate via the virtualization system 110 based on the memory map 325, as detailed in U.S. patent application Ser. No. 15/476,025. Accordingly, virtual hardware device 130 can evolve into a full emulation of all components included in the physical hardware device.

Figure 5:
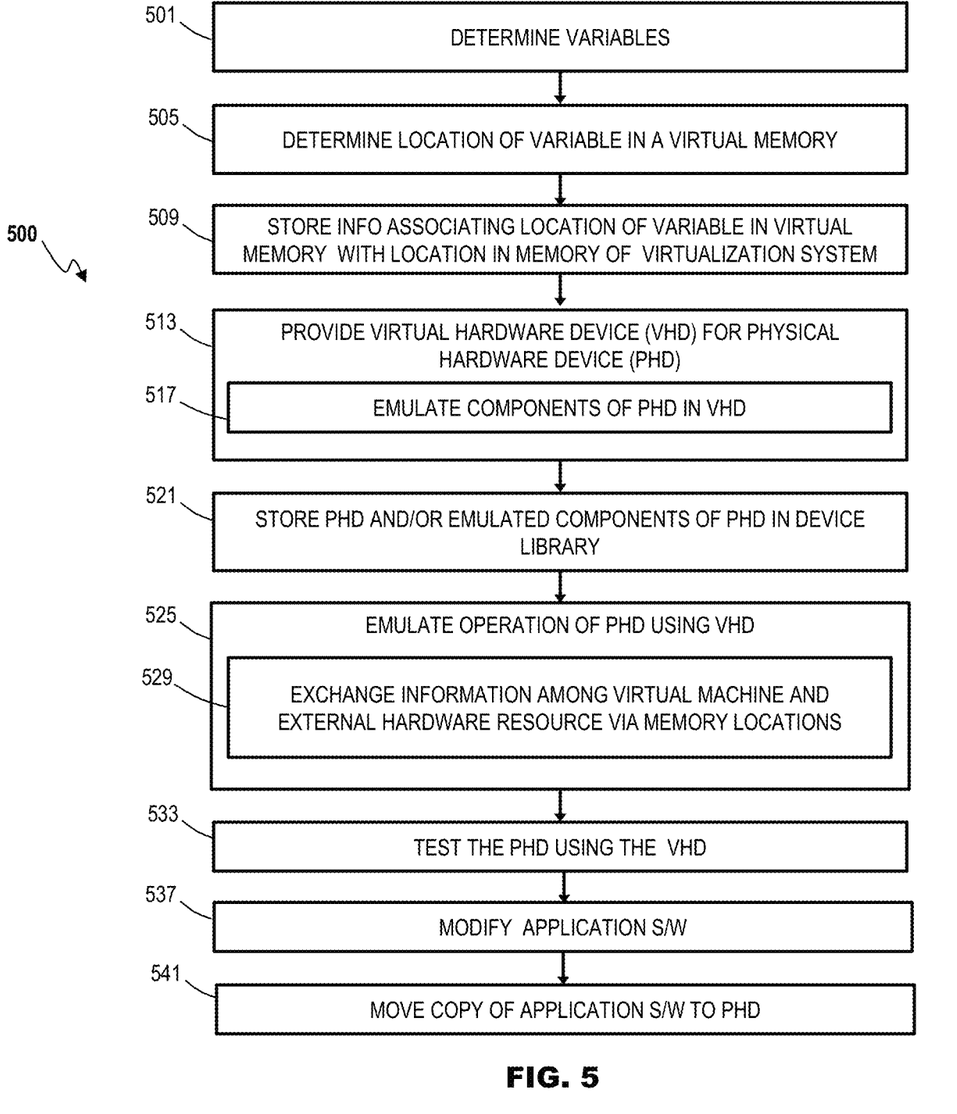
FIG. 5 shows a process flow diagram illustrating a method for virtualization and testing of a physical hardware system in accordance with aspects of the present disclosure.

The flow diagram in FIG. 5 illustrates examples of the functionality and operation of possible implementations of systems, methods, and computer program products according to various implementations consistent with the present disclosure. Each block in the flow diagrams of FIG. 5 can represent a module, segment, or portion of program instructions, which includes one or more computer executable instructions for implementing the illustrated functions and operations. In some alternative implementations, the functions and/or operations illustrated in a particular block of the flow diagram can occur out of the order shown in FIG. 5. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 5 illustrates a flow diagram of a process 500 for a test system, including operations performed in accordance with an embodiment of the present disclosure. At 501, the process 500 determines variables (e.g., variables 150) of application software (e.g., application software 140) for a physical hardware device (e.g., physical hardware device 105) emulated by a virtual machine (e.g., virtual hardware device 130). In implementations, the variable 150 determined can be one via which (e.g. through which) the application software of the virtual hardware device exchanges (e.g., sends and/or receives) information with one or more external hardware resources (e.g., external hardware resource 115). For example, in a systems integration test of a navigation unit for an avionics system, the developer can identify a location of a variable that will be provided to the navigation unit by an external sensor (e.g. air speed from a pitot tube).

At 505, the process 500 determines locations (e.g., addresses) of the variables determined at 501 in a virtual memory (e.g., virtual memory device 405) of the virtual hardware system (virtual memory device 405). The locations can be determined from a system table generated from the application software by a compiler. For example, the virtualization system can use a compiler operation that causes the software application to output the locations. Additionally, the locations can be determined by scanning (statically or dynamically) the application software at startup of a systems integration test to identify the variables 150 shared by the application software 140 with other resources (e.g., external hardware resource 115). Further, the locations can be identified through code inspection and stack offset calculations referenced from function calls.

At 509, the process 500 stores information (e.g., variable location information 317) associating the locations (e.g., variable location information 317) of the variables determined at 505 with locations in memory (e.g., memory device 341) of the virtualization system (e.g., virtualization system 110). In some implementations, the location information can be a mapping between an address of the virtual memory to an address of physical memory. Also, in some implementations (e.g., where physical memory is a shared memory), the virtualization application can establish a connection (a shared memory binding) from virtual memory to the memory device 405 and virtualization application 351. For example, the virtualization application can use an API to access an offset from a location or a named shared memory location in a shared memory window. Further, in some implementations (e.g., where the physical memory is a socket or pipe), the location information can be a data packet that maps accesses into virtual memory device 405 to I/O device link to the external hardware resource.

At 513, a virtual hardware device (e.g., virtual hardware system 130) is provided from a physical hardware device (e.g., physical hardware device 105) using the virtualization system (e.g., computing device 303 executing virtualization software (virtualization application 351, including program instructions). Constructing the virtual hardware device can include, at 517, emulating the hardware components or retrieving preexisting emulations of the components (e.g., from device library 323). At 521, the virtual hardware system constructed at 513 and/or the hardware components emulated at 517 can be stored (in, e.g., device library 323) for future reference and use in other implementations (e.g., other virtual hardware systems including one or more of the hardware components).

At 525, the virtualization system emulates the operation of the physical hardware device provided at 513 and the hardware components emulated at 517. The emulation can include, at 529, exchanging information with the external hardware resource by reading and/or writing the variables determined at 501 to/from the locations stored at 505. For example, the memory addresses of variables can be registered with the virtualization application and used to implement the functionality of each memory register found for the virtual hardware device. By doing so, the emulated hardware components of the virtual hardware device can communicate via the memory of the virtualization machine by reading and writing information to the virtual in the same manner as the hardware components of the physical hardware device. For example, in situation where a variable (e.g., one of variables 150) is communicate to the external hardware resource, the variable's memory address (e.g., 0XF803) can stored at a location 420 in a shared memory that is used to connect the variable in application software with a corresponding variable in the external hardware resource. Whereas, in the physical hardware device (e.g., physical hardware device 105) the variable 150 can be written to RAM (e.g., memory device 231). The application software can copy the variable to a buffer of a virtual component (e.g., I/O device 235) using an API call. The logic can then trigger an I/O transmission to the external hardware resource. In external hardware resource 115, an interrupt will be trigger to indicate an I/O message has been received and then external hardware software will copy the variable received from the I/O buffer using an external hardware resource API to the correct variable on the external hardware resource. Thus, implementations consistent with the present disclosure provide a high level of fidelity to the virtualization system that is greater than that which can achieved by, for example, communicating via the use of exact memory location to connect variables in the virtualization layer and the emulation of processor in the virtualization layer are what allows the target software to be run unmodified on PC development platform (or anywhere else for that matter).

At 533, the virtualization system can be used to perform testing (e.g., test and evaluation) of the physical hardware device and/or the hardware components via execution of the application software by the virtual hardware system. In implementations, the testing includes the behaviors of the components emulated at 517 in response to information accessed at the memory location determined at 505. The test can involve software debugging, operational testing, integration testing, cybersecurity testing, and so on. At 537, the developer can modify at least one of the software and/or hardware of the physical hardware device based on the test and evaluation performed at 533. At 541, the developer can move a substantially exact copy of the application software from the virtual hardware device to the physical hardware device and execute the copy on the physical hardware device without any substantial modification of the application software.

While FIG. 5 describes communication between the virtual hardware device and the external hardware resource by exchanging variables via the virtualization system using a shared memory, some implementations consistent with the present disclosure can be combined with other techniques. For example, as illustrated in FIG. 4, some implementations can initially communicate with the external hardware resource solely by exchanging variables via the virtualization system using by reading and writing particular variables to particular memory locations of a memory device (e.g., memory device 341). And, as the design of the software (e.g., APIs, BSPs, OSs, and I/O protocols) for the physical hardware matures, components of the physical hardware device (e.g., interrupt controllers (e.g., interrupt controller 249), I/O devices (e.g., I/O devices 235), and network interfaces (network interfaces 237). One or more of these components can be incorporated into the virtual machine and used to communicate at least some information with the external hardware resource by mapping locations of memory blocks of the hardware components based on a memory map (e.g., memory map 325), which would replace the memory intercept approach or be used in hybrid configuration with the memory intercept.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for testing an external hardware resource by a virtual hardware device using a virtualization system, the method comprising:
    determining a memory location of a variable through which the virtual hardware device exchanges information with the external hardware resource; and
    exchanging the information, by the virtual hardware device, with the external hardware resource via the memory location of the variable, wherein the virtual hardware device only communicates with the external hardware resource via the memory location,
    wherein the memory location of the variable used by the virtual hardware device is the same as a memory location of the variable used by the physical hardware device.

2. The method of claim 1, wherein application software of the virtual hardware device lacks a fully developed application program interface, device drivers, or board support packages.

3. The method of claim 2, further comprising moving the application software from the virtual hardware device to the physical hardware device without any modification of the application software.

4. The method of claim 1, further comprising storing information associating the memory location of the variable with a location in memory of the virtualization system.

5. The method of claim 1, further comprising emulating, by the virtualization system, hardware components of the physical hardware device in the virtual hardware device.

6. The method of claim 1, further comprising testing the physical hardware device, by the virtualization system, using the virtual hardware device.

7. The method of claim 6, wherein the testing comprises emulating behaviors of components of the physical hardware device by the virtual hardware device in response to information accessed at the memory location.

8. A virtualization system for emulating a physical hardware device, the virtualization system comprising:
    a processor,
    a data storage device, and
    program instructions stored on the data storage device that, when executed by the processor, control the virtualization system to perform operations comprising
    emulating operation of the physical hardware device using a virtual hardware device based on variable location information associating a memory location of the virtualization system with a memory location of a variable via which a virtual hardware device and the physical hardware device are configured to exchange information with an external hardware resource, wherein the virtual hardware device only communicates with the external hardware resource via the memory location.

9. The virtualization system of claim 8, wherein application software of the virtual hardware device lacks a fully developed application program interfaces, device drivers, or board support packages.

10. The virtualization system of claim 9, wherein the operations further comprise moving application software from the virtual hardware device to the physical hardware device without any modification of the application software.

11. The virtualization system of claim 8, wherein the operations comprise storing the variable location information associating the memory location of the variable with the memory location of the virtualization system.

12. The virtualization system of claim 8, wherein the operations comprise emulating, by the virtualization system, hardware components of the physical hardware device in the virtual hardware device.

13. The virtualization system of claim 8, wherein the operations comprise testing application software of the physical hardware device, by the virtualization system, using the virtual hardware device.

14. The virtualization system of claim 13, wherein the testing comprises emulating behaviors of components of the physical hardware device by the virtual hardware device in response to information accessed at the memory location.

15. A virtualization system configured to test a physical hardware device by performing operations comprising:
  providing a virtual hardware device including a virtual processor and virtual memory device that emulate a physical processor and a physical memory device of the physical hardware device;
  determining a variable in the virtual memory device through which application software of a physical hardware device is configured to exchange information with an external hardware resource;
  determining a location of the variable within the memory device of the virtualization system; and
  exchanging information among the virtual hardware device and an external hardware resource via the location of the variable within the memory device of the virtualization system, wherein the virtual hardware device only communicates with the external hardware resource via the location of the variable within the memory device of the virtualization system.

16. The virtualization system of claim 15, wherein the application software lacks a fully developed application program interface, device drivers, or board support packages.

17. The virtualization system of claim 16, wherein the operations further comprise moving the application software from the virtual hardware device to the physical hardware device without any modification of the application software.

18. The virtualization system of claim 15, wherein the operations further comprise emulating, by the virtualization system, hardware components of the physical hardware device in the virtual hardware device.

19. The virtualization system of claim 15, wherein the operations further comprise testing the physical hardware device, by the virtualization system, using the virtual hardware device.

20. The virtualization system of claim 19, wherein the testing comprises emulating behaviors of components of the physical hardware device by the virtual hardware device in response to information accessed at the location of the variable within the memory device of the virtualization system.

* * * * *